(12) United States Patent
Umayabashi et al.

(10) Patent No.: US 7,200,155 B2
(45) Date of Patent: Apr. 3, 2007

(54) COMMUNICATION SYSTEM CAPABLE OF EFFICIENTLY TRANSMITTING DATA FROM TERMINALS TO SERVER

(75) Inventors: Masaki Umayabashi, Tokyo (JP); Kazuo Takagi, Tokyo (JP); Makoto Shibutani, Tokyo (JP)

(73) Assignee: NEC Corporation, Tokyo (JP)

( * ) Notice: Subject to any disclaimer, the term of this patent is extended or adjusted under 35 U.S.C. 154(b) by 763 days.

(21) Appl. No.: 10/291,552

(22) Filed: Nov. 12, 2002

(65) Prior Publication Data

US 2004/0093422 A1    May 13, 2004

(30) Foreign Application Priority Data

Nov. 9, 2002    (JP)    ............................. 2001-345234

(51) Int. Cl.
  *H04J 3/16*    (2006.01)
  *G06F 15/16*    (2006.01)
(52) U.S. Cl. ...................................... 370/468; 709/232
(58) Field of Classification Search ................ 709/232, 709/233; 370/468, 235, 229, 230, 232; 375/219, 375/220, 225
  See application file for complete search history.

(56) References Cited

U.S. PATENT DOCUMENTS

| | | | |
|---|---|---|---|
| 4,954,965 A * | 9/1990 | Johnson et al. ............. | 709/236 |
| 5,774,658 A | 6/1998 | Kalkunte et al. | |
| 6,236,662 B1 | 5/2001 | Reilly | |
| 6,801,543 B1 * | 10/2004 | Ployer ........................ | 370/468 |
| 6,891,800 B1 * | 5/2005 | Vollmer et al. ............. | 370/236 |
| 2001/0034789 A1 * | 10/2001 | Kumagai et al. ........... | 709/233 |
| 2002/0161913 A1 * | 10/2002 | Gonzalez et al. ........... | 709/233 |

FOREIGN PATENT DOCUMENTS

EP    0 382 668    1/1990

OTHER PUBLICATIONS

European Search Report dated Feb. 26, 2003.

* cited by examiner

*Primary Examiner*—Krisna Lim
(74) *Attorney, Agent, or Firm*—Dickstein Shapiro LLP

(57) ABSTRACT

A communication system includes a server and a plurality of terminals. The server repeatedly assigns transmission periods to the terminals in a regular order, each of the terminals being permitted as a current terminal to transmit data stored in a buffer thereof to the server during an assigned transmission period assigned thereto by the server as a current transmission period. The communication system includes: a transmission controller provided in each of the terminals for transmitting a release request notification to the server in a case where the terminal finishes data transmission before the end of the assigned transmission period assigned to the terminal, and a transmission period assigning portion provided in the server for assigning a next transmission period following the current transmission period to a next terminal different from the current terminal, in response to the release request notification.

40 Claims, 12 Drawing Sheets

COMMUNICATION SYSTEM CAPABLE OF EFFICIENTLY TRANSMITTING DATA FROM TERMINALS TO SERVER

BACKGROUND OF THE INVENTION

This invention relates to a communication system for a point-to-multipoint communication, in particular, to a communication system that each of communication terminals transmits a data frame(s) thereof to a server during an assigned frame transmission period assigned thereto by the server.

Recently, with the spread of multimedia communication service for supplying sound, pictures and/or connection to internet, a demand for increasing transmission speed and reducing a production cost of a network becomes higher. There is such a demand regarding not only a backbone network but also a subscriber access network.

To meet the demand regarding the subscriber access network, Ethernet technology is applied to a subscriber access network of a public network. Ethernet technology has been developed for a local area network.

Attention is given to an application of the Ethernet technology to a passive optical network (hereinafter abbreviated as PON) that is a typical point-to-multipoint optical communication system of a shared transmission media type. Hereinafter, the PON applied with the Ethernet technology will be referred as an Ethernet-PON (or EPON) system.

A related EPON system comprises a plurality of subscriber's units (or terminals) and a station's unit (or server). The subscriber's units separately are connected to first optical fibers while the station's unit is connected to a second optical fiber. The first optical fibers are coupled to the second optical fiber in common through an optical coupler (or a passive optical device). Thus, the subscriber's units are connected to the second optical fiber in common.

The station's unit repeatedly assigns frame transmission periods to the subscriber's units in turn to avoid a collision of data frames from two or more subscriber's units. Each of the subscriber's units transmits data as the data frame(s) to the station's unit during the assigned frame transmission period assigned thereto by the station's unit.

If a certain subscribers unit has no data which should be transmitted to the station's unit, the assigned frame transmission period assigned thereto is wasted. This deteriorates communication efficiency of the EPON system. Thus, it is desirable that the time length of the frame transmission period is adjustable according to volume of the data held by each subscriber's unit.

However, it is difficult to detect (change of) the volume of the data held by each subscriber's unit for the station's unit. Accordingly, the EPON system must have a complicated structure to detect the volume of the data held by each subscriber's unit. This increases the production cost of the EPON system.

Furthermore, even if the station's unit can detect the volume of the data held by each subscriber's unit, there is a case where the station's unit assigns the frame transmission period longer than a necessary time for transmitting the data. For example, the station's unit assigns the frame transmission period having predetermined time length to the subscribers unit having no data. Thus, if the subscriber's unit does not receive new data which should be transmitted to the station's unit, the assigned frame transmission period is wasted.

As mentioned above, the related EPON has a problem of bad communication efficiency.

SUMMARY OF THE INVENTION

It is therefore an object of this invention to provide a communication system capable of transmitting data from a plurality of terminals to a server efficiently.

Furthermore, it is another object of this invention to provide a communication system having improved communication efficiency.

Other object of this invention will become clear as the description proceeds.

According to a first aspect of this invention, a communication system includes a server and a plurality of terminals. The server repeatedly assigns transmission periods to the terminals in regular order. Each of the terminals is permitted as a current terminal to transmit data stored in a buffer thereof to the server during an assigned transmission period assigned thereto by the server as a current transmission period. The communication system comprises a transmission controller provided in each of the terminals. The transmission controller is for transmitting a release request notification to the server in a case where the terminal finishes data transmission before the end of the assigned transmission period assigned thereto. A transmission period assigning portion is provided in the server to assign a next transmission period following the current transmission period to a next terminal different from the current terminal in response to the release request notification.

According to a second aspect of this invention, a communication terminal is permitted to transmit data stored in a buffer to a server during an assigned transmission period assigned thereto by the server. The communication terminal comprises a transmission controller to transmit a release request notification to the server. The release request notification is for making the server assign a next transmission period to another communication terminal in a case where the communication terminal finishes data transmission before the end of the assigned transmission period.

According to a third aspect of this invention, a communication server repeatedly assigns transmission periods to a plurality of terminals in regular order. The communication server comprises a receiving means for receiving a release request notification transmitted from a current terminal assigned with a current transmission period. A transmission period assigning portion is for assigning a next transmission period to a next terminal different from the current terminal in spite of the current transmission period when the receiving means receives the release request signal.

According to a fourth aspect of this invention, a computer program product makes communication terminal transmit data stored in a buffer to a server during an assigned transmission period assigned thereto by a server. The computer program product comprises a transmission control portion for transmitting a release request notification to the server. The release request notification is for making the server assign a next transmission period to another communication terminal in a case where the communication terminal finishes data transmission before the end of the assigned transmission period.

According to fifth aspect of this invention, a computer program product makes a server repeatedly assign transmission periods to a plurality of terminals in regular order. The computer program product comprises a receiving portion for receiving a release request notification transmitted from a current terminal assigned with a current transmission period. A transmission period assigning portion is for assigning a next transmission period to a next terminal different from the current terminal in spite of the current transmission period when the receiving portion receives the release request signal.

Figure 1:
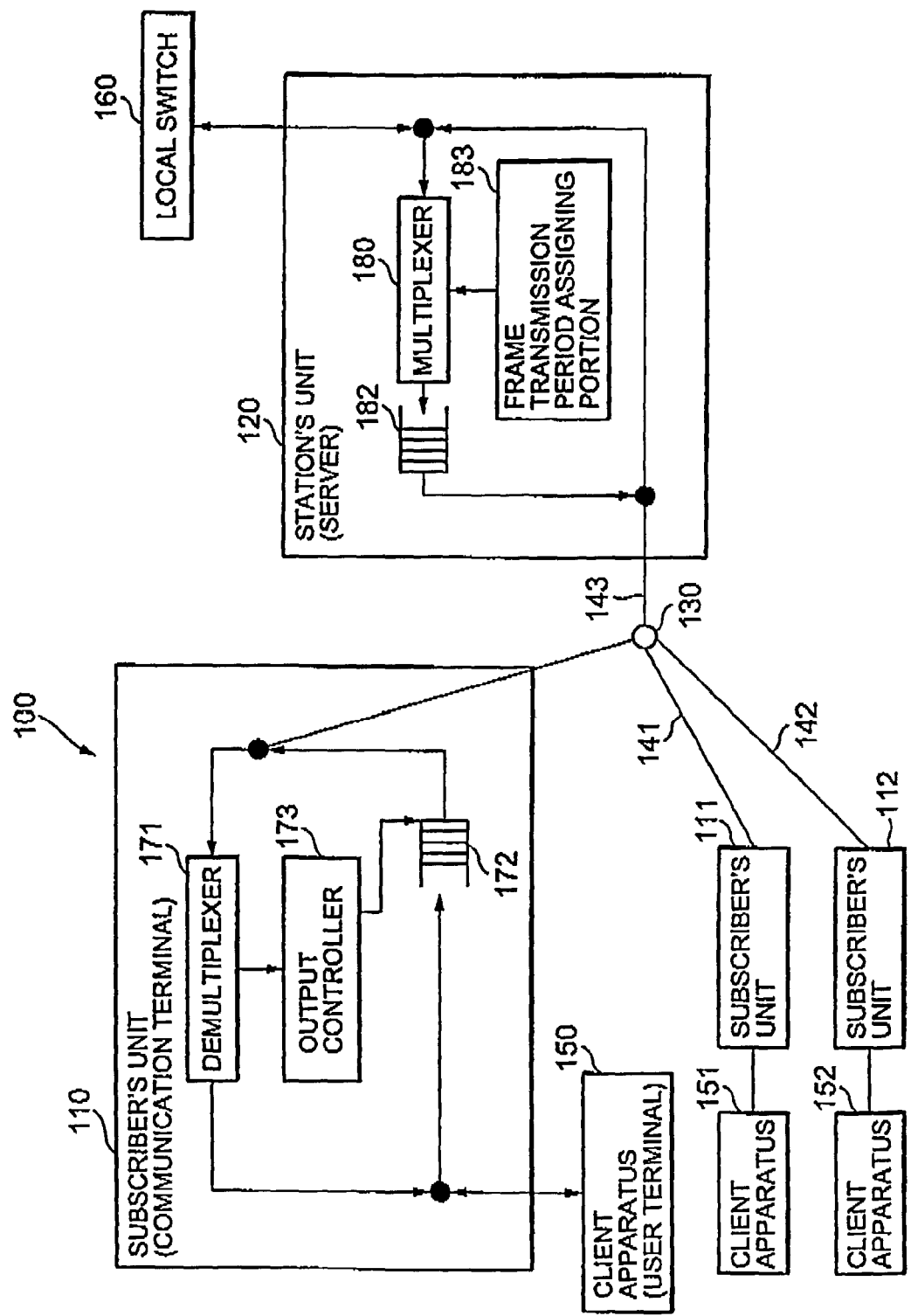
FIG. 1 is a block diagram of a related EPON system.
Figure 2:
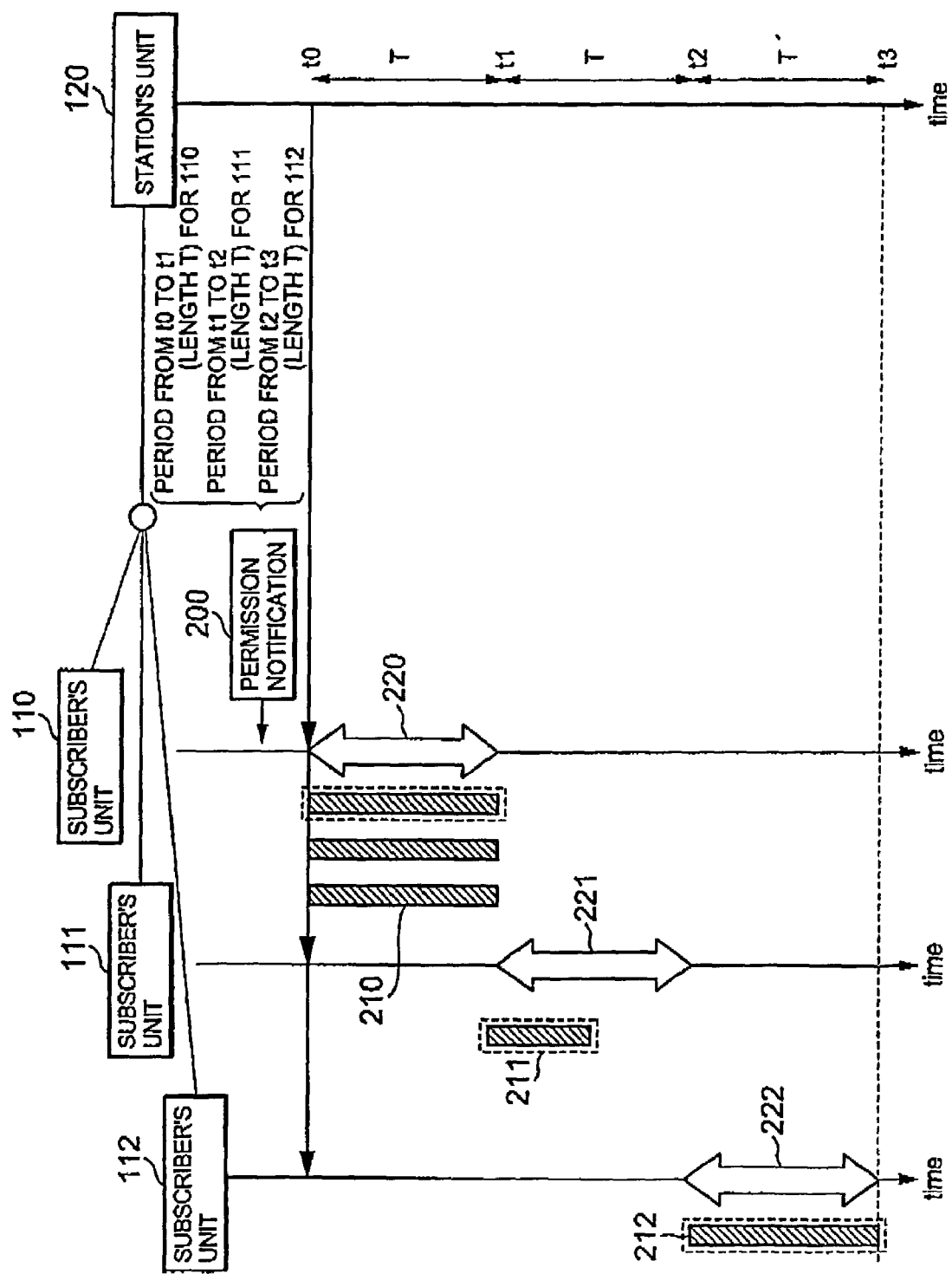
FIG. 2 is a time chart for describing assignment of frame transmission periods in the related EPON system.

DESCRIPTION OF THE PREFERRED EMBODIMENTS:

Referring to FIGS. 1 and 2, description will be at first directed to a related communication system for a better understanding of this invention.

FIG. 1 is a block diagram showing a related EPON system 100 as the related communication system. The EPON system 100 is a passive optical network (or PON) system adopting Ethernet technology.

The EPON system 100 comprises subscriber's units (or communication terminals) 110–112, a station's unit (or a server) 120, a passive signal combining/dividing unit (or a passive coupler) 130, and optical fibers 140–143.

The subscriber's units 110–112 are individually connected to client apparatuses (or user terminals) 150–152, while the station's unit 120 is connected to a local switch 160.

The optical fibers 140–142 separately connect the subscriber's units 110–112 to the passive signal combining/dividing unit 130 while the optical fiber 143 connects the passive signal combining/dividing unit 130 to the station's unit 120.

Generally, full duplex mode optical fibers for a gigabit Ethernet are used as the optical fibers 140–143 in consideration of transmission speed and distance.

In the EPON system 100, the subscriber's units 110–112 share an optical interface of the station's unit 120. Accordingly, the station's unit 120 is simplified in structure and thereby the EPON system 100 is inexpensive.

Each of the subscriber's units 110–112 comprises a demultiplexer 171, a buffer 172 and an output controller 173.

The station's unit 120 comprises a multiplexer 180, a buffer 182 and a frame transmission period assigning portion 183.

In the EPON system 100, data transmission is performed as follows.

At first, the description is made about transmission of a down data frame from the station's unit 120 to a certain (or destination) subscriber's unit.

When the station's unit 120 receives the down data frame from the local switch 160, the multiplexer 180 transmits the down data frame to the buffer 182. The buffer 182 temporarily stores the down data frame. The down data frame stored in the buffer 182 is transmitted into the optical fiber 143 as an optical down signal. The passive signal combining/dividing unit 130 divides the optical down signal into divided optical down signals to transmit them to the subscribers units 110–112 through the optical fibers 140–142. Thus, the down data frame is broadcast to all of the subscriber's units 110–112.

On receiving the divided optical down signal, each subscriber's units 110–112 detects the down data frame from the divided optical down signal. The down data frame includes an address field for a destination (or MAC) address. The demultiplexer 171 judges whether the destination address of the received data frame corresponds to an assigned address assigned thereto or not. The demultiplexer 171 transmits the down data frame to the client apparatus 150, 151 or 152 when the destination address corresponds to the assigned address. On the other hand, the demultiplexer 171 discards the down data frame when the destination address does not correspond to the assigned address.

Next, the description is made about transmission of an up data frame form the subscriber's units 110–112 to the station's unit 120.

If two or more subscriber's units 110–112 simultaneously transmit up data frames to the station's unit 120, the data frames collide with one another at the passive signal combining/dividing unit 130. Therefore, the subscribers units 110–112 transmit the up data frames in turn as follows.

The frame transmission period assigning portion 183 produces control frames to repeatedly assign frame transmission periods to the subscriber's units 110–112 in turn. Each of the control frames is transmitted to the multiplexer 180. On receiving the control frame, the multiplexer 180 multiplexes the control frame and the down data frame. The control frame is transmitted to all of the subscriber's units as mentioned above regarding the down data frame.

In each of the subscriber's units 110–112, the demultiplexer 171 transmits the control frame for addressed thereto to the output controller 173. In a case where the control frame is used for all of the subscriber's units 110–112 in common, the demultiplexer 171 extracts a part for addressed thereto. The output controller 173 transmits an up data frame(s) stored in the buffer 172 into the corresponding optical fiber 140 (or 141 or 142) during an assigned frame transmission period assigned by the use of the control frame. The up data frame(s) stored in the buffer 172 are supplied from the corresponding client apparatus 150 (or 151 or 152).

The up data frame(s) transmitted into the optical fiber 140 (or 141 or 142) travels to the local switch 160 through the passive signal combining/dividing unit 130, the optical fiber 143 and the station's unit 120 without collision with another up data frame.

FIG. 2 is a time chart for describing assignment of the frame transmission periods and the transmission of the up data frame. FIG. 2 shows a case where the control frame is used for all of the subscriber's units 110–112 in common.

In FIG. 2, the control frame is broadcast to the subscriber's units 110–112 as a permission notification 200 at a time point of t0.

The permission notification 200 assigns frame transmission periods 220, 221 and 222 having a regular time length of "T" to the subscriber's units 110, 111 and 112, respectively. The frame transmission period 220 assigned to the subscriber's unit 110 has a start point of "t0" and an end point of "t1". The frame transmission period 221 assigned to the subscriber's unit 111 has a start point of "t1" and an end point of "t2". The frame transmission period 222 assigned to the subscriber's 112 has a start point of "t2" and an end point "t3". The subscriber's units 110, 112 and 113 may transmit the up data frames 210, 211 and 212 during the frame transmission periods 220, 221 and 222, respectively.

In the related EPON system, the subscriber's units 110, 111 and 112 occupy the frame transmission period 220, 221 and 222, respectively. Accordingly, if necessary time for transmitting the up data frame(s) of each subscriber's unit is shorter than the frame transmission period assigned to the subscriber's unit, unused period is made in the assigned frame transmission period.

For instance, it is assumed that the subscriber's units 110, 111 and 112 have the up data frames 210, 211 and 212 having volume of "3T", "T/2" and "T", respectively. The volume is represented by necessary time for transmitting the up data frame(s) stored in the buffer of each subscriber's unit. In this case, the subscribers unit 110, 111 and 112 transmit the up data frame(s) surrounded by broken lines in FIG. 2. The subscriber's unit 110 still holds the data frame(s) with volume of 2T after an elapse of the frame transmission period 220. On the other hand, the subscriber's unit 111 has no up data frame from the middle of the frame transmission period 221. Thus, the subscriber's unit 111 wastes a half of the frame transmission period 221. In other words, transmission of the up data frame(s) held by the subscriber's unit 110 is delayed needlessly. Therefore, the related EPON system has bad transmission efficiency.

If the station's unit 120 can assign the frame transmission period having variable time length according to volume of the up data frame(s) held by each subscriber's unit, the wasted time is reduced. However, it is difficult to detect the volume of the up data frame(s) held by each subscriber's unit for the station's unit. Furthermore, the station's unit is impossible to estimate correctly change of the volume of the up data frame held by each subscriber's unit. Accordingly, the station's unit tends to assign a longer frame transmission period longer than a necessary time length in the case where the stations' unit estimates the change of the volume of the data frame held by each subscriber's unit.

Figure 3:
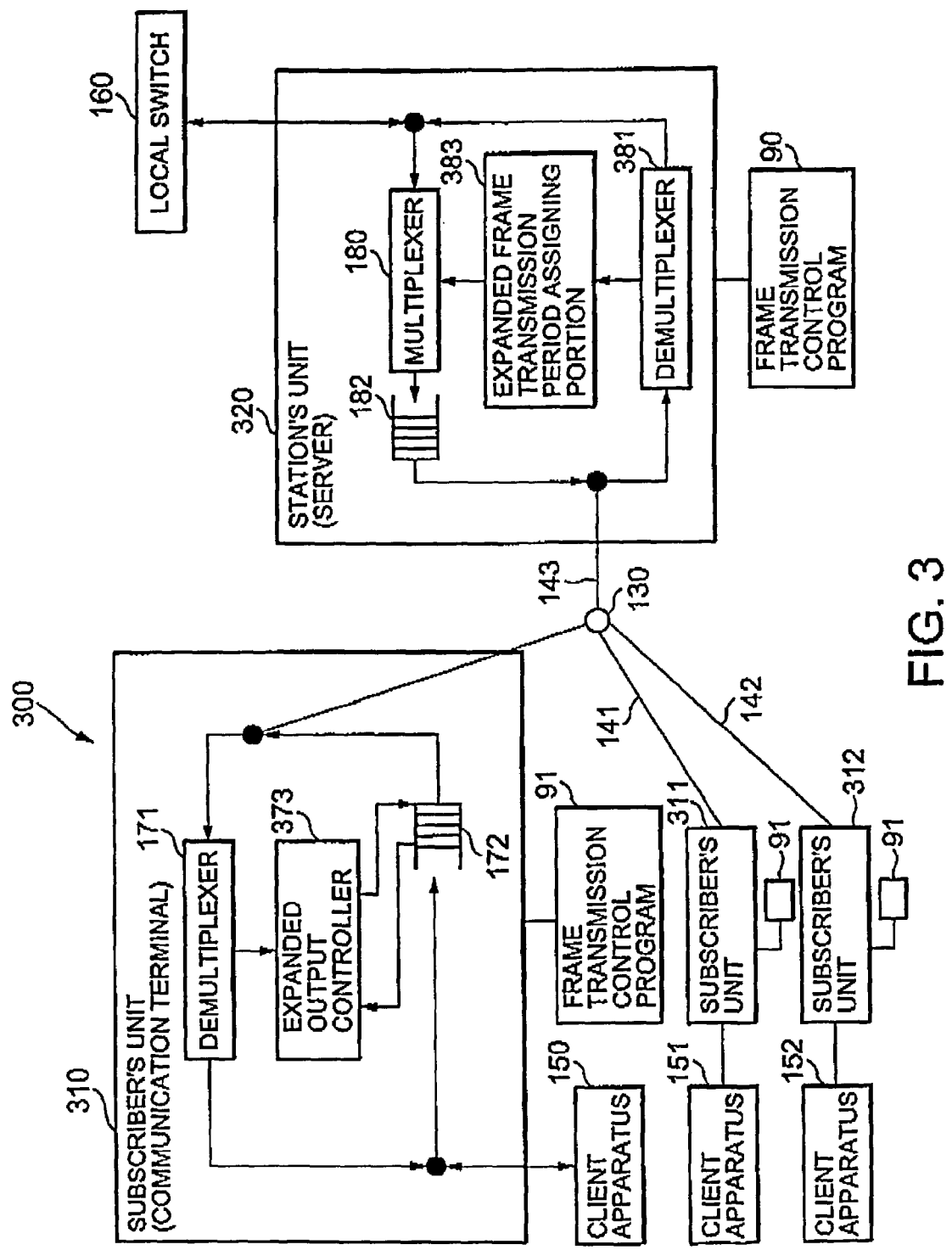
FIG. 3 is a block diagram of an EPON system according to a first embodiment of this invention.
Figure 4:
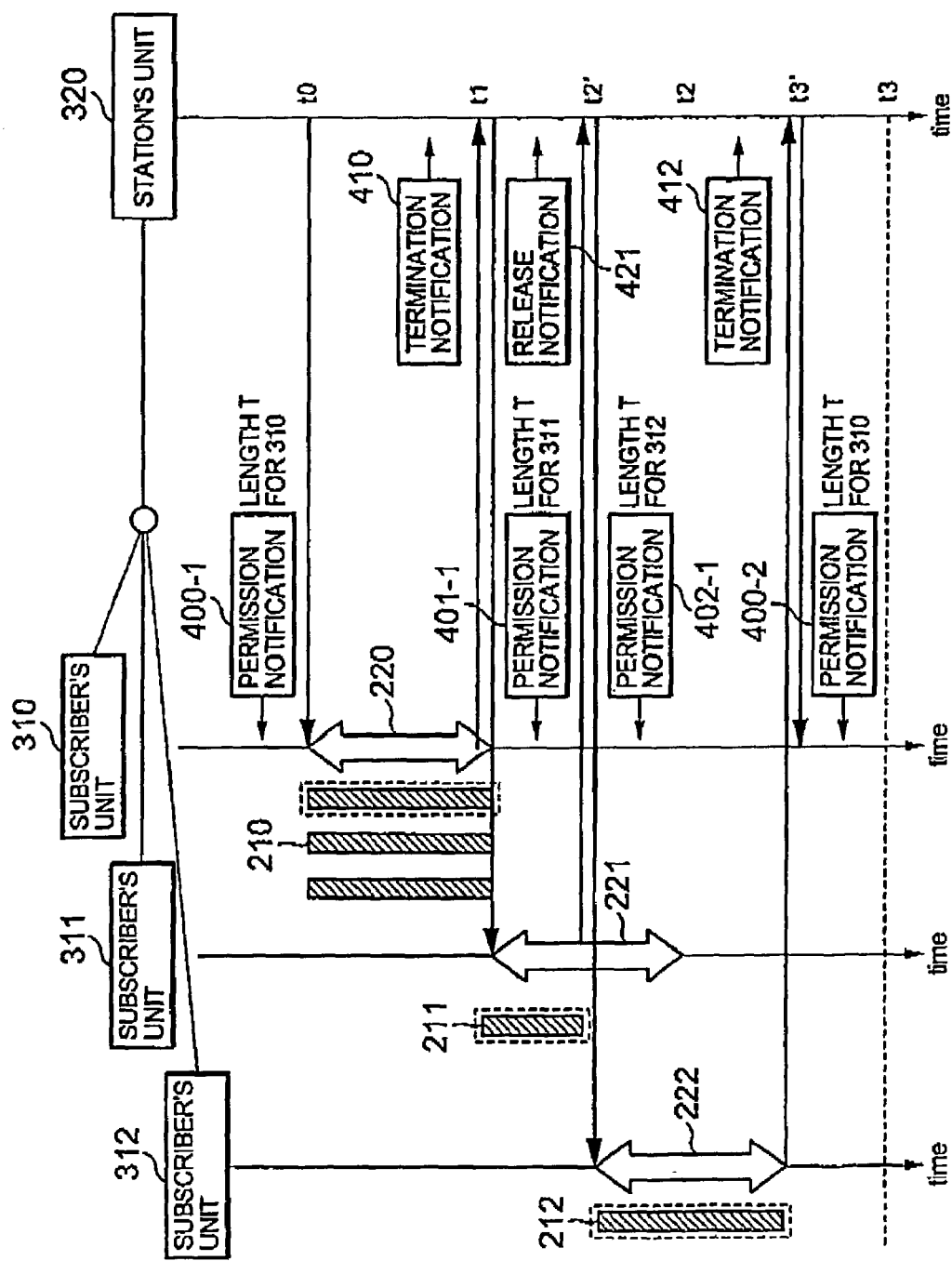
FIG. 4 is a time chart for describing assignment of frame transmission periods in the EPON system of FIG. 1.

Referring to FIGS. 3 and 4, the description will proceed to an EPON system according to a first embodiment of this invention. Similar parts are designated by like reference numerals.

In FIG. 3, the EPON system 300 comprises subscriber's unit (or communication terminals) 310–312, a station's unit (or a server) 320, the optical fibers 140–143, and the passive signal combining/dividing unit 130 connected to the optical fibers 140–143. The subscriber's units 310–312 are individually connected to the client apparatuses 150–152. The station's unit is connected to the local switch 160.

Each of the subscribers units 310–312 comprises the demultiplexer 171, the buffer 172 and an expanded output controller 373. For instance, each subscriber's unit is realized by a CPU or the like to execute a frame transmission control program 91 for the communication terminal. The frame transmission control program 91 may be recorded on a magnetic storage medium, an optical disc, a semiconductor memory, or the like. At any rate, the frame transmission control program 91 is loaded into the subscriber's unit to control operation of the subscriber's unit.

The station's unit 320 comprises the multiplexer 180, the buffer 182 and an expanded frame transmission period assigning portion 383. For example, the station's unit 320 is realized by a CPU or the like to execute a frame transmission control program 90 for the server. The frame transmission control program 90 may be also recorded on a magnetic storage medium, an optical disc, a semiconductor memory, or the like. The frame transmission control program 90 is loaded into the station's unit 320 to control operation of the station's unit 320.

The expanded frame transmission period assigning portion 383 produces the permission notifications to assign the frame transmission periods to the subscriber's unit 310, 311 and 312 in regular order. Each of the permission notifications is for any one of the subscribers units 310, 311 and 312. That is, each of the permission notifications includes a destination information representing any one of the subscriber's units 310, 311 and 312.

The expanded frame transmission period assigning portion 383 cyclically transmits the permission notifications to the subscriber's units 310, 311 and 312 in regular order. That is, the permission notifications are transmitted to the subscriber's units 310, 311 and 312 by turns.

In each subscriber's unit, the expanded output controller 373 transmits the up data frame(s) stored in the buffer 172 when it receives the permission notification. In this case, the expanded output controller 373 transmits a termination notification to the station's unit at the end of the assigned frame transmission period when it transmits the up data frame(s) until the end point of the assigned frame transmitted period. The expanded output controller 373 transmits a release request notification to the station's unit 320 in a case of finishing transmission of the up data frame(s) before the end of the assigned frame transmission period. For example, the expanded output controller 373 finishes the transmission of the up data frame(s) when the buffer 172 becomes empty or when the up data frame(s) stored in the buffer at a time point of receiving the permission notification is transmitted.

Messages may be defined as the termination notification and the release request notification. Regarding the termination notification, the predetermined number of zero bits may be used as the message.

The termination notification, the release signal and the up data frame(s) are transmitted to the demultiplexer 381 through the optical fiber 140, 141 or 142, the passive signal combining/dividing unit 130 and the optical fiber 143.

In the station's unit 120, the demultiplexer 381 transmits the termination notification and the release request notification to the expanded frame transmission period assigning portion 383. Furthermore, the demultiplexer 381 transmits the up data frame(s) to the local switch 160.

When the expanded frame transmission period assigning portion 383 receives the termination notification or the release request notification supplied from a current subscriber's unit (for example, 310), it produces a next permission notification and transmits it to a next subscribers unit (for example, 311) following the current subscriber's unit.

Referring to FIG. 4, the description will be made in more detail about assigning the transmission periods to the subscriber's units 310, 311 and 312 in the EPON system of FIG. 3. Herein, transmission delay and signal processing time are not considered.

At first, the station's unit 320 transmits the permission notification 400-1 to the subscriber's unit 310 to assign the frame transmission period 210 with a regular time length of "T" from the start point of "t0" to the end point of "t1". The permission notification 400-1 notifies the subscriber's unit 310 of the length "T". The permission notification 400-1 may notifies the subscriber's unit 310 of the end point "t1" instead of or together with the length "T". Furthermore, the permission notification 400-1 may notify the subscriber's unit 310 of the start point "t0" together with the end point "t1".

The subscriber's unit 310 has the data frame(s) 210 with volume of "3T" at the time point of "t0". On receiving the permission notification 400-1, the subscriber's unit 310 transmits the data frame(s) with the volume of "T" to the station's unit 320 for the frame transmission period 220. At the time point "t1", the subscribers unit 310 terminates transmission of the up data frame(s) 210 and transmits the termination notification 410 to the station's unit 320.

On receiving the termination notification 410, the station's unit 320 transmits the permission notification 401-1 to the subscriber's unit 211 to assign the frame transmission period 221 with the regular time length of "T" from a start point of "t1" to an end point of "t2".

The subscriber's unit 311 has the data frame(s) 211 with volume of "T/2" at the time point of "t1". On receiving the permission notification 402-1, the subscribers unit 311 transmits the data frame(s) 211 to the station's unit 320. The transmission of the data frame(s) 211 is finished at the time point of "t2". The subscribers unit 311 transmits the release request notification 421 to the station's unit 320 when the transmission of the up data frame(s) 211 is finished before the end point "t2" of the frame transmission period 221.

When the station's unit 320 receives the release request notification 421, it transmits the permission notification 402-1 to the subscriber's unit 212 though the frame transmission period 221 remains. The permission notification 402-1 gives the frame transmission period 222 with the regular time length of "T" from a start point of "t2" to an end point of "t3". The frame transmission period 222 is moved up from the original period having the start point of "t2" and the end point of "t3".

The subscriber's unit 312 has the data frame(s) 212 with volume of "T" at the time point of "t2". On receiving the permission notification 402-1, the subscribers unit 312 transmits the up data frame(s) 212 to the station's unit 320. The transmission of the up data frame(s) 212 is finished at the end point of the frame transmission period 222. After the finish of the transmission of the up data frame(s) 212, the subscriber's unit 312 transmits the termination notification 412 to the station's unit 320. Thus, a first cycle for assignment of the frame transmission periods to all of the subscriber's units 310, 311 and 312 is finished and a second cycle follows.

When the station's unit 320 receives the termination notification 412, it transmits the next permission notification 400-2 to the subscriber's unit 210 to assign the next frame transmission period with the regular time length of "T". Subsequently, the operation as mentioned above is repeated.

As mentioned above, the station's unit 321 assigns the frame transmission period with the regular time length of "T" to each subscriber's unit in this embodiment However, the assigned frame transmission period is shortened in a case where the current subscriber's unit finishes the transmission of the up data frame(s) before the end point of the assigned frame transmission period. Therefore, the EPON system as a whole transmits data frames from the subscriber's units to the station's unit efficiently. Thus, the communication efficiency of the EPON system is improved.

Next, the description will be made about an EPON system according to a second embodiment of this invention. The EPON system is different from that of the first embodiment in operation of the expanded frame transmission period assigning portion 383 of the station's unit 320.

The expanded frame transmission period assigning portion 383 changes the time length of the frame transmission period according to the termination notification. That is, the expanded frame transmission period assigning portion 383 assigns a longer frame transmission period than the regular time length of "T" to the subscriber's unit which transmitted the termination notification at the last time (or in the last cycle). On the other hand, the expanded frame transmission period assigning portion 383 assigns the transmission period with the regular time length of "T" to the subscriber's unit which transmitted the release request notification at the last time.

While the release request notification signifies that the subscriber's unit has no data frame, the termination notification generally signifies that the subscriber's unit still holds the up data frame(s) at the end of the assigned frame transmission. Therefore, the expanded frame transmission period assigning portion 383 is possible to find whether each subscriber's unit holds up data frame(s) which should be transmitted in next time (or cycle) or not. When the expanded frame transmission period assigning portion 383 receives the termination notification, it memorizes the subscriber's unit which transmits the termination notification until next time.

Even if the longer frame transmission period assigned to the current subscriber's unit is longer than the necessary time for transmitting the up data frame(s) stored in the buffer of the current subscriber's unit, it is not wasted. This is because the release request notification shortens the assigned longer frame transmission period.

The termination notification is also used in a case where the transmission of the up data frame(s) is exactly finished at the end of the assigned frame transmission period. In this case, the longer frame transmission period is assigned to the subscriber's unit having no up data frame(s). However, the release request notification also shortens the longer frame transmission period in this case. Therefore, the communication efficiency of the EPON system is not deteriorated by the longer frame transmission period.

Figure 5:
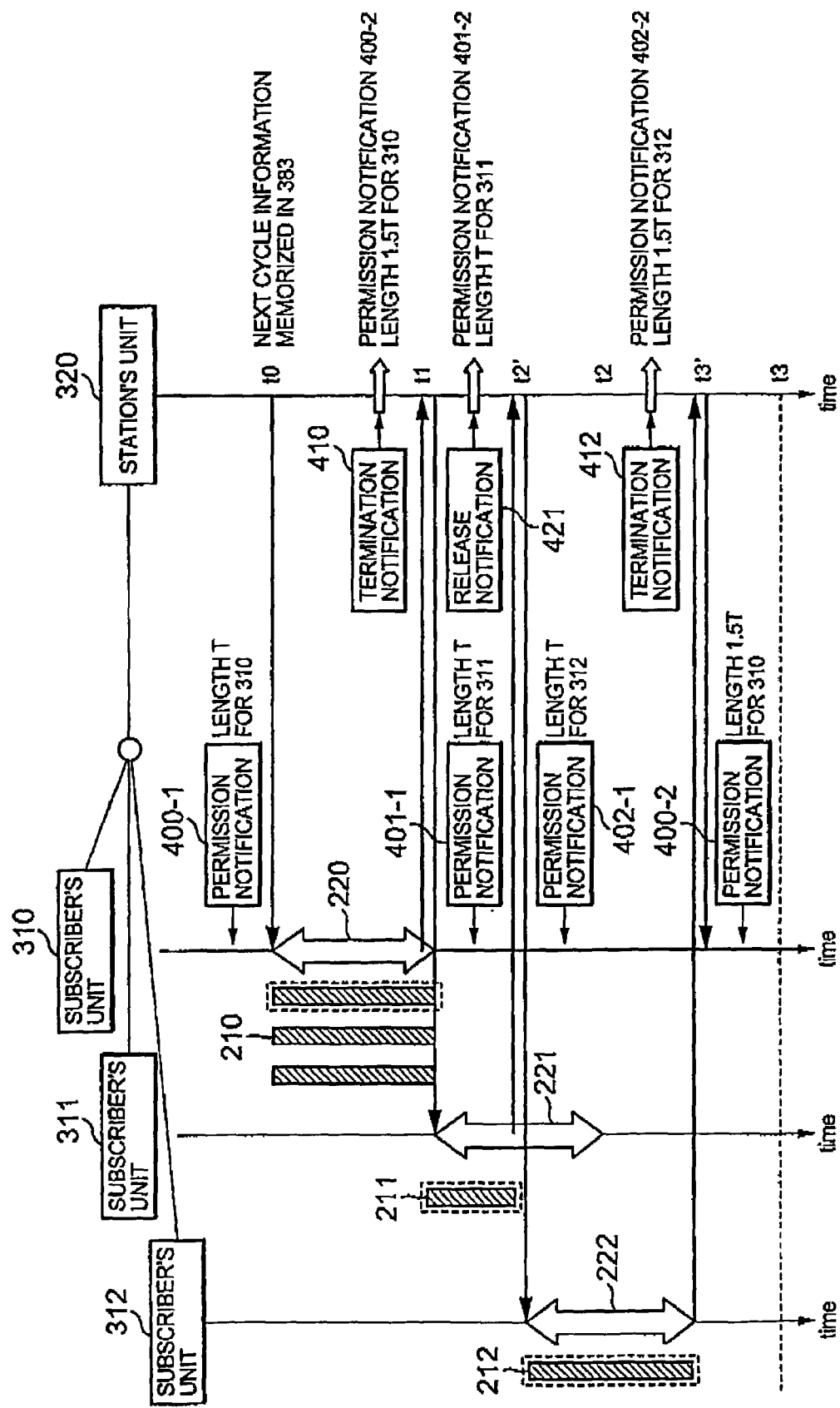
FIG. 5 is a time chart for describing assignment of frame transmission periods in an EPON system according to a second embodiment of this invention.

FIG. 5 is a time chart for describing assignment of the transmission periods in this embodiment. FIG. 5 shows a situation similar to that shown in FIG. 4.

In FIG. 5, the station's unit 320 receives the termination notification 410 from the subscriber's unit 310. In this case, the station's unit 320 memorizes that the longer frame transmission period should be assigned to the subscriber's unit 310 in next time or cycle.

Similarly, the station's unit 320 memorizes that the longer frame transmission period should be assigned to the subscriber's unit 312 in next time when it receives the termination notification 412 from the subscriber's unit 312.

In this embodiment, the station's unit 320 furthermore memorizes that the regular transmission period should be assigned to the subscriber's unit 311 in next time.

After the station's unit 320 receives the termination notification 412, It transmits the permission notification 400-2 to the subscribers unit 310 to assign the longer frame transmission period with a longer time length of "1.5T". Consequently, the subscriber's unit 310 is possible to transmits the up data frame(s) with volume of "1.5T".

After then, the station's unit 320 transmits the permission notifications 401-2 and 402-2 to the subscriber's unit 311 and 311 by turns.

Though the subscriber's unit 312 is assigned with the longer transmission period in spite of nothing of the up date frame(s), the assigned frame transmission period is shortened by transmitting the release request notification to the station's unit 320. This is similar to a case where each subscribers unit is assigned with the frame transmission period with the regular time length of "T". Thus, the EPON system is possible to realize higher communication efficiency.

As mentioned above, in this embodiment, because the longer frame transmission period is assigned to the subscribers unit having the up data frame(s), the EPON system has the higher communication efficiency than that of the first embodiment. In addition, delay characteristics concerning up data frame transmission is improved in the EPON system.

Next, the description will be made about an EPON system according to a third embodiment of this invention. The EPON system is different from that of the second embodiment in operation of the expanded output controller 373 of each subscriber—s unit and the expanded frame transmission period assigning portion 383 of the station's unit 320.

The expanded output controller 373 transmits an expanded termination notification as the termination notification to the station's unit 320. The expanded termination notification includes traffic information relating to the volume of the up data frame(s) stored in the buffer 172.

The traffic information represents the remaining volume of the up data frame(s) stored in the memory at the end of the assigned frame transmission period. The traffic information may include a comparison result between the remaining volume of the up data frame(s) and a first threshold in spite of the remaining volume. Moreover, the traffic information may includes the volume of new data frame(s) received after the last time, a comparison result between the volume of the new data frame(s) and a second threshold, the maximum waiting time of the data frame(s) remaining in the buffer, and/or a comparison result between the maximum waiting time and a threshold time.

The expanded frame transmission period assigning portion 383 changes the time length of the frame transmission period assigned to the subscribers unit according to the traffic information included in the expanded termination notification transmitted from the subscriber's unit at the last time.

Figure 6:
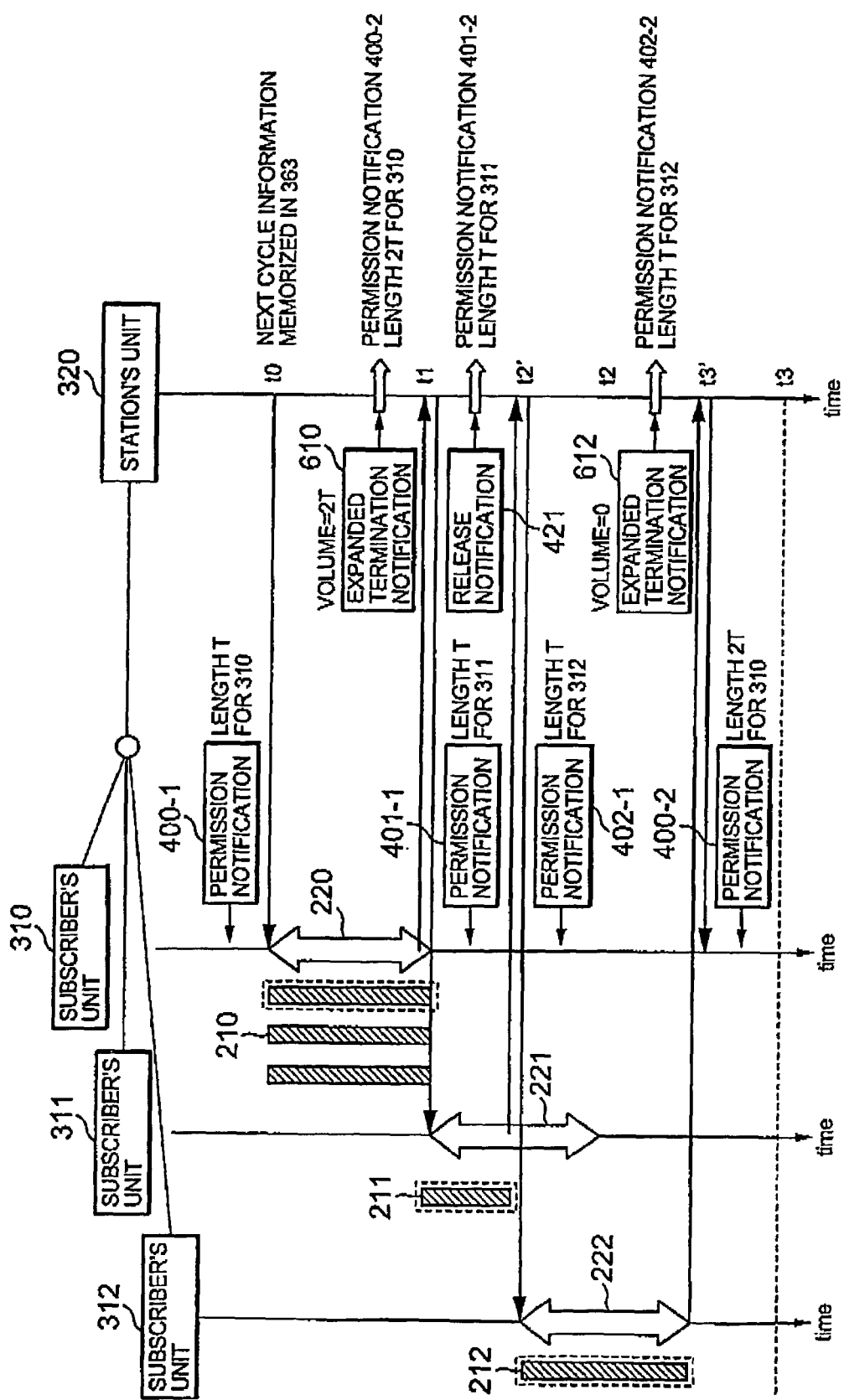
FIG. 6 is a time chart for describing assignment of frame transmission periods in an EPON system according to a third embodiment of this invention.

FIG. 6 is a time chart for describing assignment of the transmission periods in this embodiment. FIG. 6 shows a situation similar to that shown in FIG. 5.

In FIG. 6, the subscriber's unit 310 transmits the expanded termination notification 610 at the time point of "t1". The expanded termination notification includes the traffic information which signifies that the subscribers unit 310 has the up data frame(s) of a time length of "2T" at the time point of "t1".

The station's unit 320 transmits the permission notification 400-2 to the subscribers unit 310 to assign the longer frame transmission period with the time length of "2T". The time length is not necessarily equal to the volume of the remaining up data frame(s) of subscribers unit 310. For instance, the time length may be discretely varied according to volume of the remaining up data frame(s).

The subscriber's unit 312 transmits the expanded termination signal 612 at the time point of "t3". The expanded termination notification 612 includes the traffic information which signifies that the subscriber's unit 312 has no up data frame(s) at the time point of "t3".

The station's unit 320 will assign the frame transmission period with the regular time length of "T" to the subscriber's unit at the next time.

As mentioned above, the station's unit 320 changes the time length of the frame transmission period according to the remaining up data frame(s) stored in the buffer of the each subscriber's unit. Therefore, the delay characteristics of the up data frame transmission is further improved in the EPON system.

Referring FIGS. 7 and 8, the description will be made about an EPON system according to a fourth embodiment of this invention.

Though the transmission delay is ignored in the EPON systems of the above-mentioned embodiments, It can not be ignored in an actual EPON system. FIG. 7 shows a case where the first, the second or the third embodiment is applied to the actual EPON system.

Figure 7:
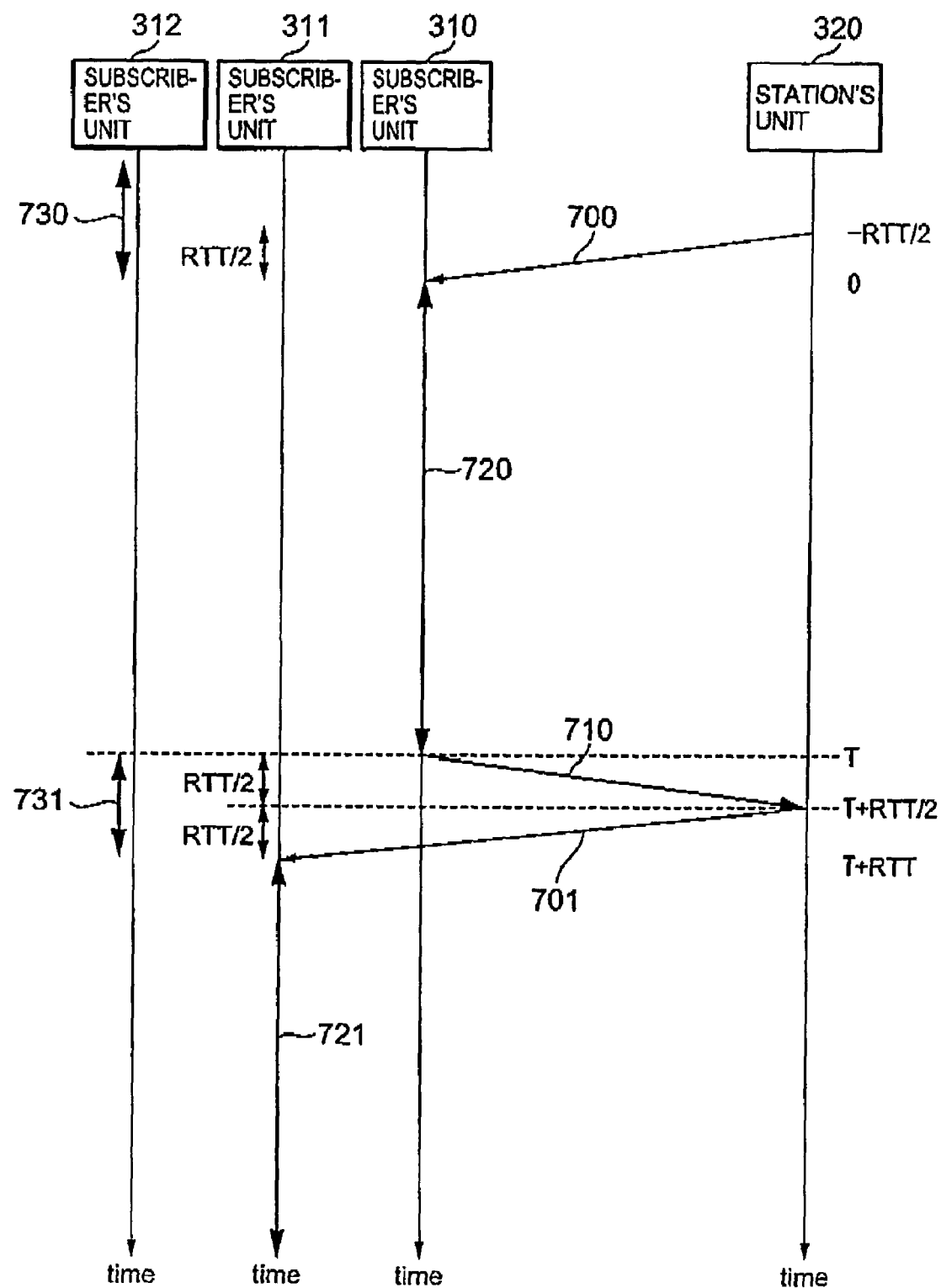
FIG. 7 is a time chart for describing a problem of transmission delay in the EPON system according to each embodiment of this invention.

In FIG. 7, it is assumed that the subscribers unit 310 receives a permission notification 700 at a time point of "0". In this case, the station's unit 320 must transmit the permission notification 700 at a time point of "−RTT/2". Herein "RTT" represents a time which is equal to a double of the transmission delay between the station's unit 320 and each subscriber's unit.

When the subscribers unit 310 transmits a termination notification 710 at the end of the assigned frame transmission period 720 with the regular time length of "T", the station's unit 320 receives the termination notification 710 at a time point of "T+RTT/2". Even if the station's unit 320 immediately transmits a next permission notification 701 at the time point of "T+RTT/2" to the subscriber's unit 311, the subscriber's unit 311 receives the permission notification 701 at a time point of "T+RTT". Accordingly, the subscriber's unit 311 is possible to transmit the up data frame(s) after the time point of "T+RTT".

As easily understood from FIG. 7, an unused period 731 is caused between the frame transmission periods 720 and 721. Such an unused period is caused between every two frame transmission periods. These unused periods deteriorate the communication efficiency of the EPON system.

Figure 8:
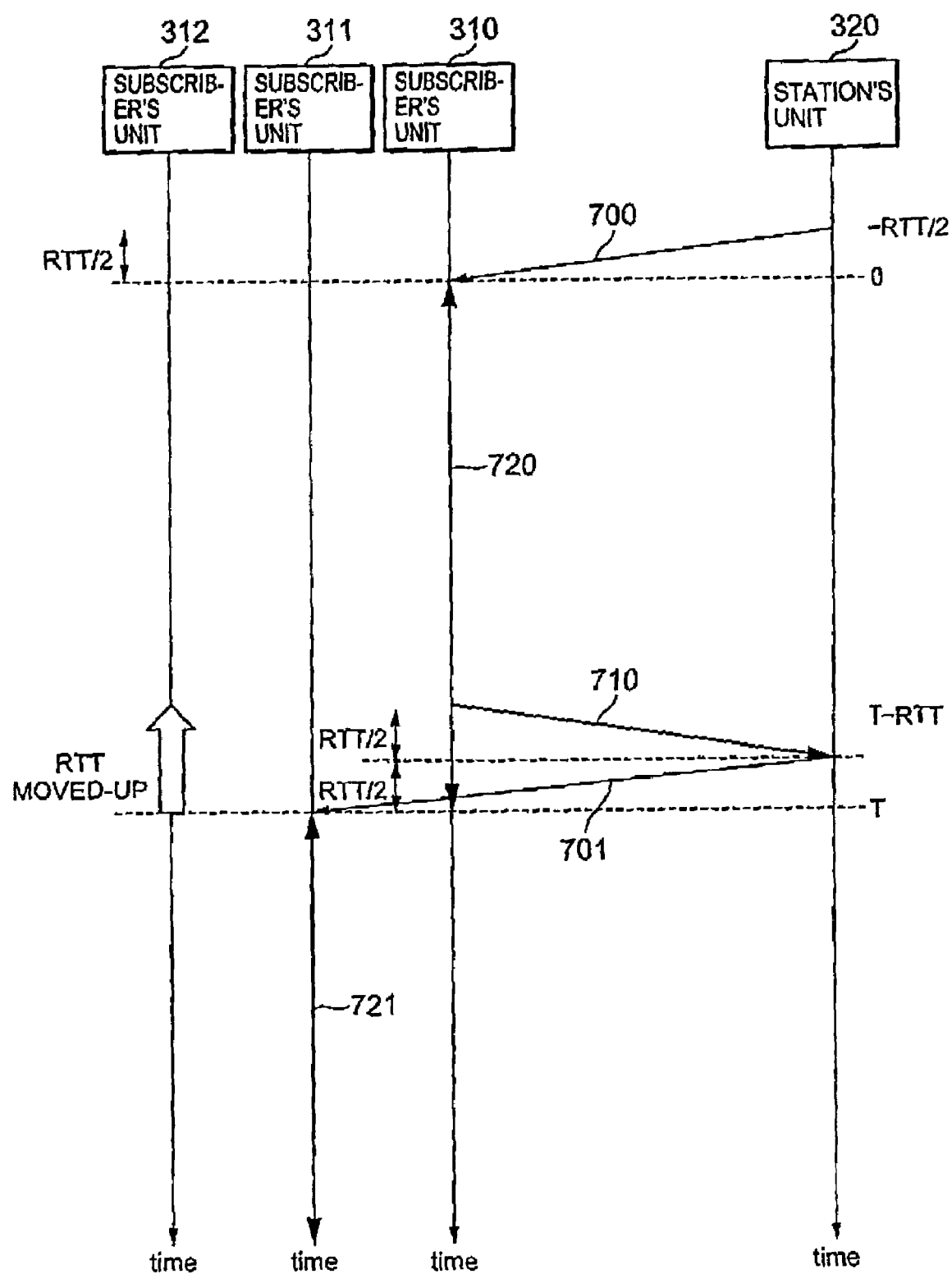
FIG. 8 is a time chart for describing transmission timing of a termination notification in an EPON system according to a fourth embodiment of this invention.

To reduce or remove the unused periods, in the EPON system of the fourth embodiment, each subscriber's unit transmits the termination notification prior to the end of the assigned frame transmission period as shown in FIG. 8.

In FIG. 8, the subscriber's unit 310 transmits the termination notification 710 at the time point of "T−RTT" so that the subscribers unit 311 receives the permission notification 701 at the time point of "T". In other words, the subscribers unit 310 transmits the termination notification 710 so that the station's unit 320 can transmit the permission notification 701 at the time point of "T−RTT/2". The permission notification 701 transmitted at the time point of "T−RTT/2" reaches the subscriber's unit 311 at the time point of "T". Thus, the subscribers unit 311 is assigned with the frame transmission period 721 having the start point of "T". That is, unused time is not caused between the frame transmission period 720 and 721. Therefore, the communication efficiency of the EPON system is further improved.

Regarding to the release request notification, each subscriber's unit may transmit it in the same manner as the termination notification. That is, each subscriber's unit may transmit the release request notification at a time of "RTT" ahead of the original transmission timing which is equal to a time point of finishing the transmission of the up data frame(s).

Referring to FIGS. 9 to 12, the description will be made about deciding transmission timing of the release request notification and the termination notification in more detail. Hereinafter, a symbol "F" designates the volume of the up data frame(s) stored in the buffer 172 of the subscriber's unit 310. The volume "F" represents the necessary time for transmitting the up data frame(s). Unlike the case of the first to third embodiments, the volume "F" of the up data frame(s) of the subscriber's unit 310 Is not always equal to "3T".

When the subscriber's unit 310 receives the permission notification 700, it compares the volume "F" with the time length of the assigned frame transmission period 720. Herein, it is assumed that the time length of the assigned frame transmission period 720 is equal to "T".

If the volume "F" is smaller than the time length "T", the subscribers unit 310 must transmit the release request notification 820 to the station's unit 320. The subscribers unit 310 decides transmission timing of the release request notification 820 as follows.

Figure 9:
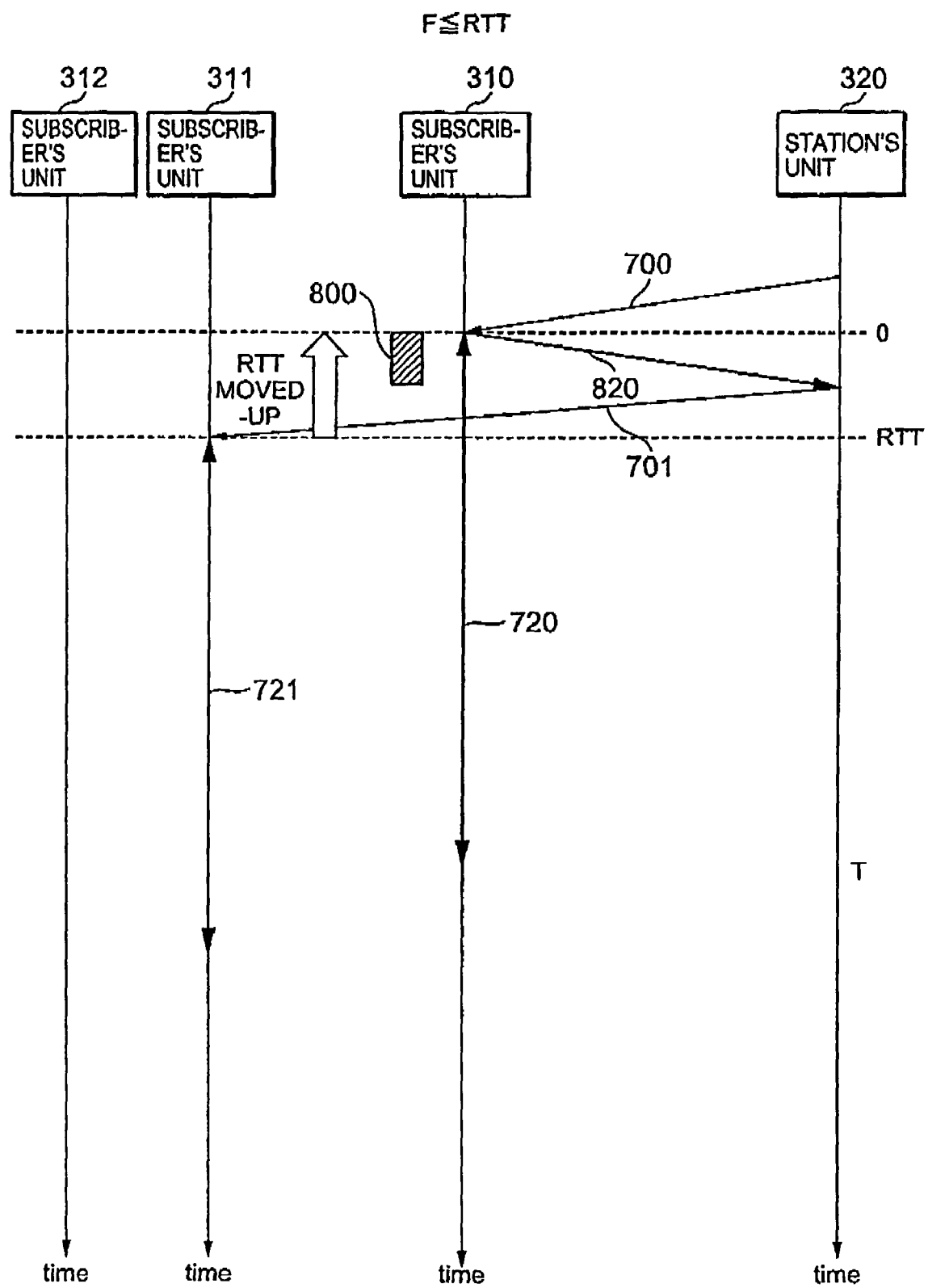
FIG. 9 is a time chart for describing transmission timing of a release request notification in a case of $F \leq RTT$.

FIG. 9 shows a case where the volume "F" Is equal to or smaller than the double transmission delay time of "RTT".

In the case, the subscribers unit 310 immediately transmits the release request notification 820 after the decision of transmitting the release request notification 820 to minimize the unused time equal to "RTT-F".

Figure 10:
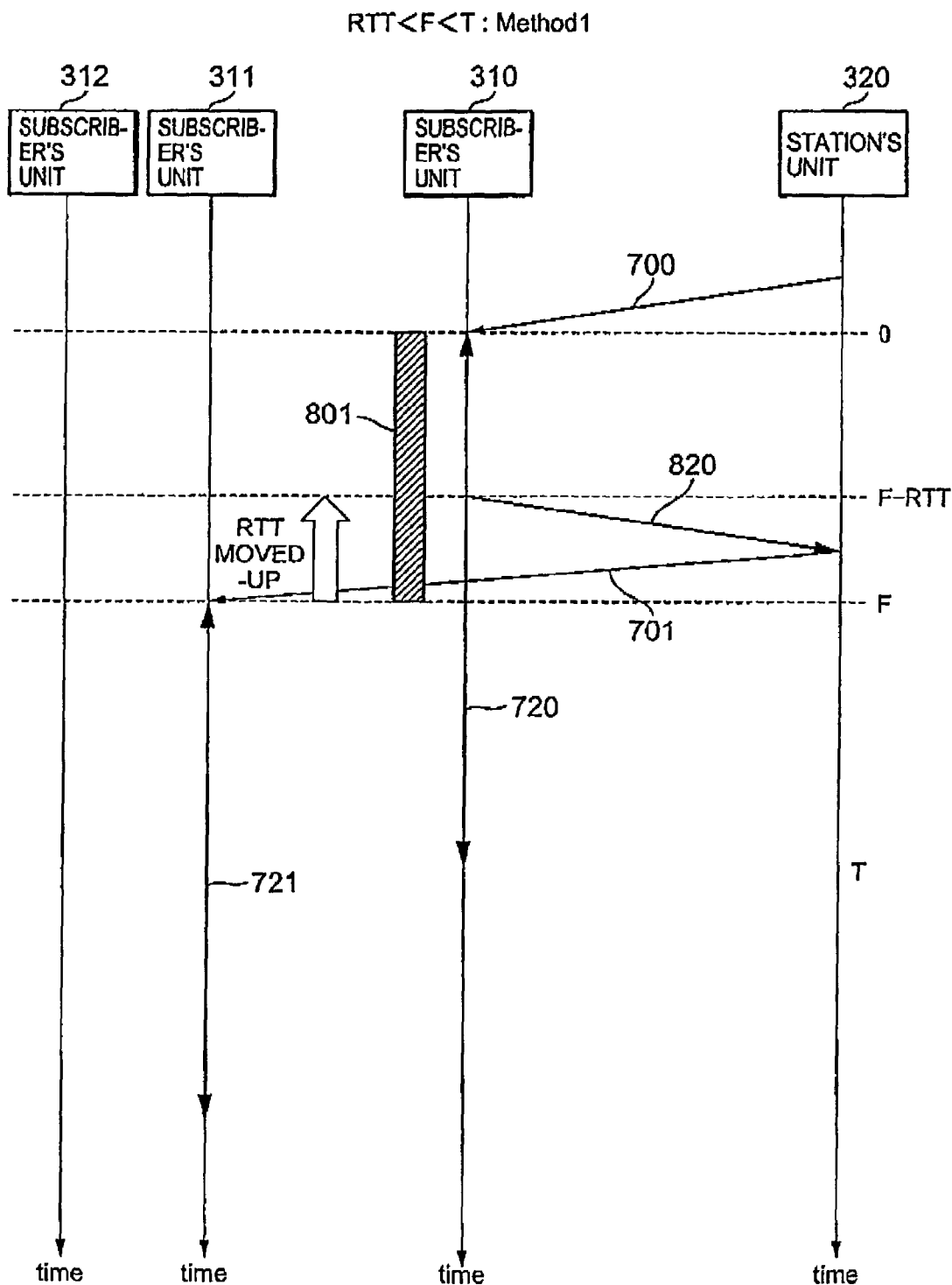
FIG. 10 is a time chart for describing transmission timing of a release request notification in a first case of $RTT<F<T$.
Figure 11:
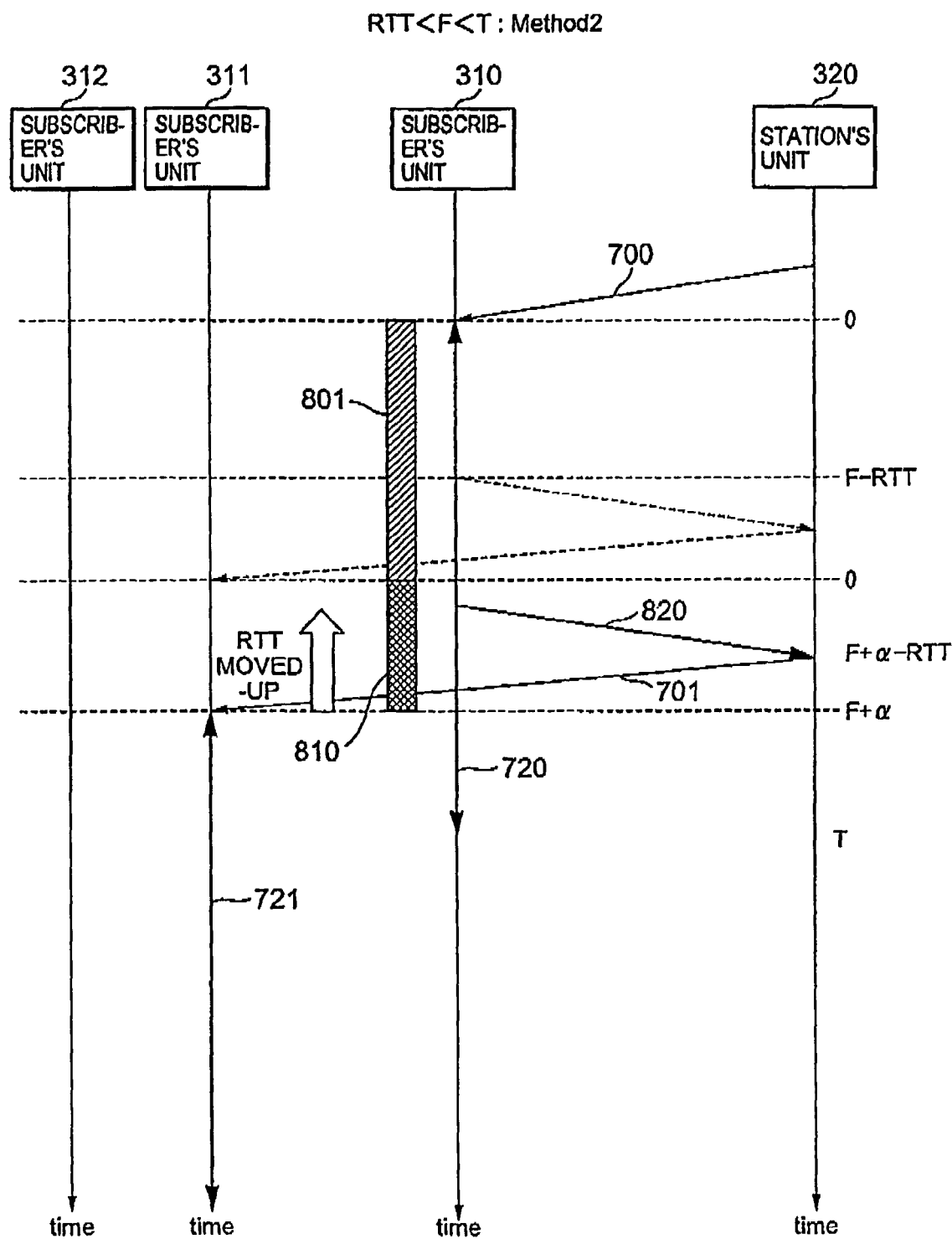
FIG. 11 is a time chart for describing transmission timing of a release request notification in a second case of $RTT<F<T$.

FIGS. 10 and 11 shows a case where the volume "F" is lager than the delay time "RTT" and smaller than the time length "T" of the assigned frame transmission period 720. In this case, two methods are considered.

In a first method shown in FIG. 10, the subscriber's unit 310 transmits the release request notification 820 at the time point of "F-RTT" prior to finishing the transmission of the up data frame(s) with the volume of "F". Accordingly, the permission notification transmitted by the station's unit 320 reaches the subscriber's unit 311 at the time point of "F". Therefore, the subscriber's unit 311 Is possible to start transmitting the up data flame(s) thereof at the time point of "F". That is, there is nothing of the unused time between the end of transmission of the up data frame(s) of the subscriber's unit 310 and the start point of the frame transmission period 721.

In a second method shown in FIG. 11, the subscriber's unit 310 finds the time point of "F-RTT" as a temporary transmitting timing of the release request notification at the reception point "0" of the permission notification 700. The subscriber's unit 310 receives a new data frame(s) 810 with a volume "α" from the client apparatus 150 connected thereto between the time points "0" and "F-RTT". At the time point "F-RTT", the subscriber's unit 310 further finds the time point "F+α-RTT". Then, the subscriber's unit 310 transmits the release request notification 820 at the time point of "F+α-RTT". Accordingly, the subscriber's unit 311 is assigned with the frame transmission period 721 having a start point of "F+α". Unused time is not caused between the end point of the new data frame 810 and the start point of the frame transmission period 721.

If the time point of "F+α" is later than the end point of the frame transmission period 720, the subscribers unit 310 transmits the termination notification at the time point of "T". The termination notification may be transmitted prior to the time point "T" as mentioned below with reference to FIG. 12.

In a case where the volume "F" is equal to or lager than the time length "T", the subscriber's unit 310 must transmit the termination notification 710 to the station's unit 320.

Figure 12:
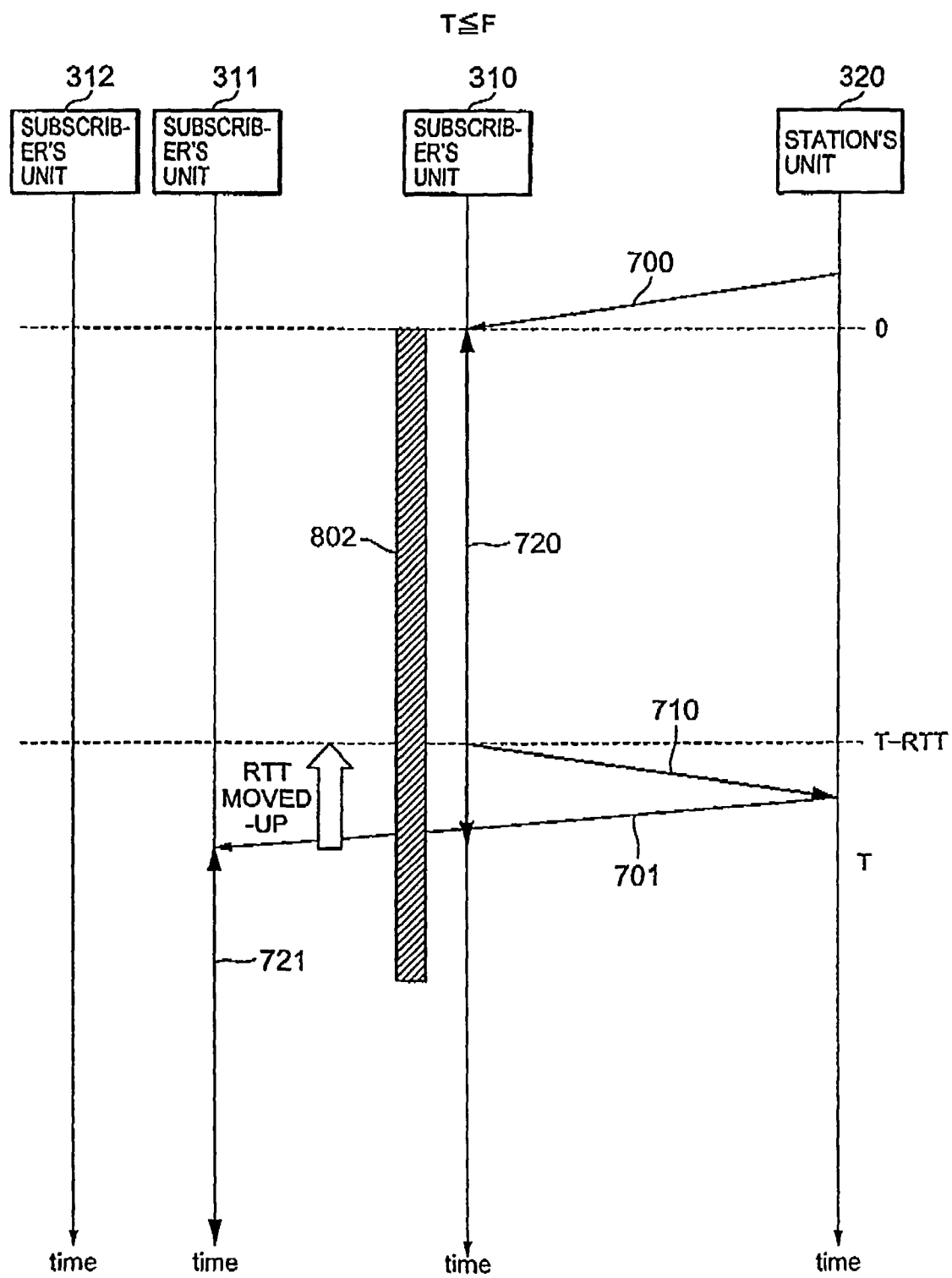
FIG. 12 is a time chart for describing transmission timing of the termination notification in a case of $T \leq F$.

FIG. 12 shows the case where the volume "F" Is equal to or lager than the delay time "RTT".

In this case, the subscribers unit 310 transmits the termination notification 710 at the time point of "T-RTT" so that the frame transmission period 721 follows the frame transmission period 720.

As mentioned above, since the release request signal and the termination signal are transmitted before the end of up data frame transmission and of the assigned frame transmission period, unused time is reduced. Therefore, the communication efficiency of the EPON system is improved.

While this invention has thus far been described in conjunction with the preferred embodiments thereof, it will readily be possible for those skilled in the art to put this invention into practice in various other manners.

For example, in the first embodiment, the remaining period of the frame transmission period 221 and a regular frame transmission period of "T" may be assigned to the next subscribers unit 312 as the next frame transmission period 222. In this case, the frame transmission period 222 has the start point of "t2" and an end point of "t3". Furthermore, a total time for assigning the frame transmission periods to all of the subscriber's units for a cycle is fixed.

In addition, in the second embodiment, a shorter frame transmission period than the regular time length of "T" may be assigned to the subscribers unit which transmitted the release request notification at the last time or cycle. In this case, it is desirable to fix the total time of the frame transmission periods assigned to all of the subscribers units for a cycle.

Furthermore, In the second method of the fourth embodiment (see FIG. 11), consideration of the new up data frame(s) supplied from the client apparatus during the assigned frame transmission period may be repeated any number (e.g. N) of times. For instance, it is assumed that the subscriber's unit 310 furthermore receives new up data frame(s) with volume "β" between the time points "F-RTT" and "F+α-RTT". In this case, the subscriber's unit 310 may find the time point "F+α+β-RTT" to transmit the release request notification 820. When the time point "F+α+β" is later than the end point of the assigned frame transmission period 720, the termination notification is transmitted at the point "T-RTT" or the end point of the assigned transmission period 720.

Though signal-processing time of the station's unit 320 is ignored in above-mentioned embodiments, it may be considered. In this case, the moved-up time must be equal to or smaller than the sum of the signal-processing time and the double transmission delay "RTT". This is because the next frame transmission period starts before the end point of the current frame transmission period when the moved-up time is larger than the sum of the signal-processing time and the double transmission delay "RTT".

Similarly, signal-processing time of each subscribers unit may be considered.

In the case as shown in FIGS. 10 and 12, the release request notification and the termination notification may be immediately transmitted to the station's unit 320 when the transmission timing of them are found. In this case, the release request notification and the termination notification must include time information representing a time point (or timing) the staton's unit 320 should be transmit the next permission notification to the next subscriber's unit.

The subscriber's unit and the client apparatus may be unified.

The expanded output controller 373 and the expanded frame transmission period assigning portion 383 may be realized by hardware.

What is claimed is:

1. A communication system including a server and a plurality of terminals, said server repeatedly assigning transmission periods to said terminals in regular order, each of said terminals being permitted as a current terminal to transmit data stored in a buffer thereof to said server during an assigned transmission period assigned thereto by said server as a current transmission period, said communication system comprising:
    a transmission controller provided in each of said terminals for transmitting a release request notification to said server in a case where the terminal finishes data transmission before the end of the assigned transmission period assigned to the terminal, and
    a transmission period assigning portion provided in said server for assigning a next transmission period following the current transmission period to a next terminal different from the current terminal, in response to the release request notification, the transmission period assigning portion assigning the next transmission period such that it may start before the scheduled end of the current transmission period.

2. A communication system as claimed in claim 1, wherein said transmission period assigning portion assigns the next transmission period to the next terminal in consideration of the end point of the data transmission performed by the current terminal in a case where it receives the release request notification from the current terminal.

3. A communication system as claimed in claim 1, wherein said transmission period assigning portion assigns both of the remaining of the current transmission period and a regular transmission period for the next terminal as the next transmission period in a case where it receives the release request notification from the current terminal.

4. A communication system as claimed in claim 1, wherein the release request notification comprises a series of a predetermined number of zero bits.

5. A communication system as claimed in claim 1, wherein said transmission controller transmits a termination notification to said server in a case where the terminal performs the data transmission until the end of the assigned transmission period assigned to the terminal.

6. A communication system as claimed in claim 5, wherein the termination notification includes traffic information which is held by the terminal and which is related to volume of said data stored in said buffer.

7. A communication system as claimed in claim 6, wherein the traffic information represents said volume of the data stored in said buffer and/or a comparison result showing whether the volume of the data stored in said buffer is larger than a threshold or not.

8. A communication system as claimed in claim 5, wherein said transmission period assigning portion assigns a longer transmission period longer than a regular transmission period to the next terminal in a case where the next terminal sent the termination notification at the last time.

9. A communication system as claimed in claim 8, wherein said transmission period assigning portion assigns a shorter transmission period shorter than the regular transmission period to the next terminal in a case where the next terminal sent the release request notification at the last time to fix a total time of the assigned transmission periods assigned to all of said terminals in each cycle.

10. A communication system as claimed in claim 6, wherein said transmission period assigning portion decides length of the next transmission period on the basis of the traffic information which the next terminal sent to said server at the last time.

11. A communication system as claimed in claim 10, wherein said transmission period assigning portion assigns a shorter transmission period shorter than the regular transmission period to the next terminal in a case where the next terminal sent the release request notification at the last time to fix a total time of the assigned transmission periods assigned to all of said terminal in each cycle.

12. A communication system as claimed in claim 5, wherein said transmission controller transmits the termination notification at a predetermined preceding time ahead of the end of the assigned transmission period assigned to the terminal.

13. A communication system as claimed in claim 12, wherein the predetermined preceding time is equal to a double transmission delay time between the terminal and said server.

14. A communication system as claimed in claim 12, wherein the predetermined preceding time is longer than a double transmission delay time between the terminal and said server and shorter than a sum of the double transmission delay time and a processing time for assigning the next transmission period to the next terminal in said server.

15. A communication system as claimed in claim 1, wherein said transmission controller transmits the release request notification at a predetermined preceding time ahead of the end point of the data transmission.

16. A communication system as claimed in claim 15, wherein the predetermined preceding time is equal to a double transmission delay time between the terminal and said server.

17. A communication system as claimed in claim 15, wherein the predetermined preceding time is longer than a double transmission delay time between the terminal and said server and shorter than a sum of said double transmission delay time and a processing time for assigning the next transmission period to the next terminal in said server.

18. A communication system as claimed in claim 15, wherein said transmission controller immediately transmits the release request notification after reception of a notification of the assigned transmission period assigned to the terminal by said server in a case where a necessary time for the data transmission of the terminal is shorter than the assigned transmission period assigned to the terminal.

19. A communication system as claimed in claim 15, wherein said transmission controller transmits the release request notification after an elapse of a difference between a necessary time for the data transmission of the terminal and the predetermined preceding time from a time point of a reception of a notification of the assigned transmission period assigned to the terminal by said server, in a case where the necessary time is longer than the predetermined preceding time and shorter than the assigned transmission period.

20. A communication system as claimed in claim 15, a necessary time for data transmission being longer than the predetermined preceding time and smaller than the assigned transmission period assigned to the terminal by said server, wherein said transmission controller carries out the steps of: finding a first time point corresponding to the predetermined preceding time ahead of the end point of the data transmission; finding a second time point a necessary time, for transmitting data arrived from a time point of reception of a notification of the assigned transmission period to the first time point, elapses from the first time point; judging whether the second time point is before the end of the assigned transmission period or not, sending the release request notification at the second time point when the second time point is before the end of the assigned transmission period; and sending the termination notification at the end of the assigned transmission period when the second time point is at or after the end of the assigned transmission period.

21. A communication system as claimed in claim 15, a necessary time for data transmission being longer than the predetermined preceding time and smaller than the assigned transmission period assigned to the terminal by said server, wherein said transmission controller carries out the steps of: finding a first time point corresponding to the predetermined preceding time ahead of the end point of the data transmission; finding a second time point a first necessary time, for transmitting data arrived from a time point of reception of a notification of the assigned transmission period to the first time point, elapses from the first time point; finding an N-th (N: integer, larger than 3) time point an N−1-th necessary time, for transmitting data arrived from an N−2 time point to said N−1 time point, elapses from an N−1 time point; judging whether said N-th time point is before the end of the assigned transmission period or not, sending the release request notification at the N-th time point when the N-th time point is before the end of the assigned transmission period; and sending the termination notification at the end of the assigned transmission period when the N-th time point is at or after the end of the assigned transmission period.

22. A communication system as claimed in claim 15, said transmission controller carries out the steps of: finding necessary time for the data transmission; comparing the necessary time with the assigned transmission period; deciding a first time point transmission of said data is finished when the necessary time shorter than the assigned transmission period; deciding a second time point the server transmits a notification representing the next transmission period to the next terminal on the basis of the first time point; and transmitting the release request notification with a information representing the second time point.

23. A communication system as claimed in claim 1, wherein said transmission period assigning portion transmits a notification of an end point of the next transmission period to the next terminal to assign the next transmission period to the next terminal.

24. A communication system as claimed in claim 1, wherein each of said terminals uses an Ethernet frame to perform data transmission.

25. A communication terminal which is permitted to transmit data stored in a buffer to a server during an assigned transmission period assigned thereto by said server, said communication terminal comprising:

a transmission controller for transmitting a release request notification to said server to make said server assign a next transmission period to another communication terminal in a case where said communication terminal finishes data transmission before the end of the assigned transmission period, said server assigning the next transmission period in response to the release request such that the next transmission period may begin before the scheduled end of the assigned transmission period.

26. A communication terminal as claimed in claim 25, wherein said transmission controller transmits a termination notification to said server to make said server assign the next transmission period to the other communication terminal in a case where the terminal performs the data transmission until the end of the assigned transmission period.

27. A communication terminal as claimed in claim 26, wherein said transmission controller transmits the termination notification at a predetermined preceding time ahead of the end of the assigned transmission period assigned to said communication terminal.

28. A communication terminal as claimed in claim 25, wherein said transmission controller transmits the release request notification at a predetermined preceding time ahead of the end of the data transmission.

29. A communication server which repeatedly assigns transmission periods to a plurality of terminals in regular order, said communication server comprising:

a receiving means for receiving a release request notification transmitted from a current terminal assigned with a current transmission period, and a transmission period assigning portion for assigning a next transmission period to a next terminal different from the current terminal such that the next transmission period may begin before the scheduled end of the current transmission period when said receiving means receives the release request signal.

30. A communication server as claimed in claim 29, wherein said receiving means receives a termination notification representing the end of the current transmission period from the current terminal.

31. A communication server as claimed in claim 30, wherein said transmission period assigning portion assigns a longer transmission period longer than a regular transmission period to the next terminal which transmitted the termination notification at the last time.

32. A communication server as claimed in claim 29, wherein said transmission period assigning portion assigns a shorter transmission period shorter than a regular transmission period to a next terminal which transmitted the release request notification at the last time.

33. A computer-readable medium storing a computer program product which makes communication terminal transmit data stored in a buffer to a server during an assigned transmission period assigned thereto by a server, said computer program product comprising:

a transmission control portion for transmitting a release request notification to said server to make said server assign a next transmission period to another communication terminal in a case where said communication terminal finishes data transmission before the end of the assigned transmission period, said server assigning the next transmission period in response to the release request such that the next transmission period may begin before the scheduled end of the assigned transmission period.

34. A computer-readable medium as claimed in claim 33, wherein said transmission control portion transmits a termination notification to said server to make said server assign the next transmission period to the other communication terminal in a case where the terminal performs the data transmission until the end of the assigned transmission period.

35. A computer-readable medium as claimed in claim 34, wherein said transmission control portion transmits the termination notification at a predetermined preceding time ahead of the end of the assigned transmission period assigned to said communication terminal.

36. A computer-readable medium as claimed in claim 33, wherein said transmission control portion transmits the release request notification at a predetermined preceding time ahead of the end of the data transmission.

37. A computer-readable medium storing a computer program product which makes a server repeatedly assign transmission periods to a plurality of terminals in regular order, said computer program product comprising: a receiving portion for receiving a release request notification transmitted from a current terminal assigned with a current transmission period, and a transmission period assigning portion for assigning a next transmission period to a next terminal different from the current terminal such that the next transmission period may begin before the scheduled end of the current transmission period when said receiving portion receives the release request signal.

38. A computer-readable medium as claimed in claim 37, wherein said receiving portion receives a termination notification representing the end of the current transmission period from the current terminal.

39. A computer-readable medium as claimed in claim 38, wherein said transmission period assigning portion assigns a longer transmission period longer than a regular transmission period to the next terminal which transmitted the termination notification at the last time.

40. A computer-readable medium as claimed in claim 37, wherein said transmission period assigning portion assigns a shorter transmission period shorter than a regular transmission period to a next terminal which transmitted the release request notification at the last time.

* * * * *

UNITED STATES PATENT AND TRADEMARK OFFICE
CERTIFICATE OF CORRECTION

PATENT NO. : 7,200,155 B2  Page 1 of 1
APPLICATION NO. : 10/291552
DATED : April 3, 2007
INVENTOR(S) : Masaki Umayabashi et al.

It is certified that error appears in the above-identified patent and that said Letters Patent is hereby corrected as shown below:

On the Title Page:

[30]    Foreign Application Priority Data:
          Please delete: "Nov. 9, 2002  (JP) .......... 2001-345234", and
add --Nov. 9, 2001  (JP) ...... 2001-345234 --

Signed and Sealed this

Twelfth Day of June, 2007

JON W. DUDAS
*Director of the United States Patent and Trademark Office*